Aug. 23, 1960

P. F. MAEDER 2,949,784

GYROSCOPE DEVICE

Filed May 26, 1959

INVENTOR.
PAUL F. MAEDER
BY
Dike, Thompson & Bronstein
ATTORNEYS

Aug. 23, 1960  P. F. MAEDER  2,949,784
GYROSCOPE DEVICE
Filed May 26, 1959  2 Sheets-Sheet 2
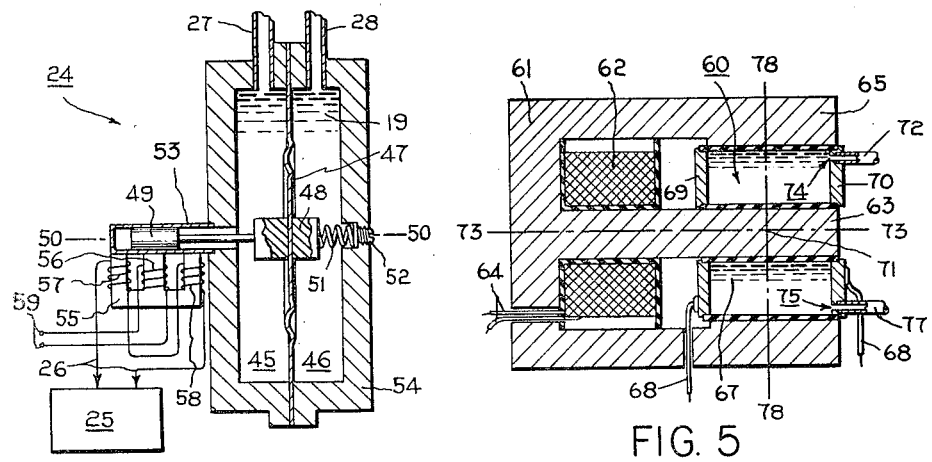
FIG. 4
FIG. 5
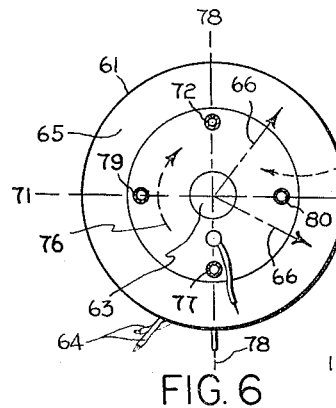
FIG. 6
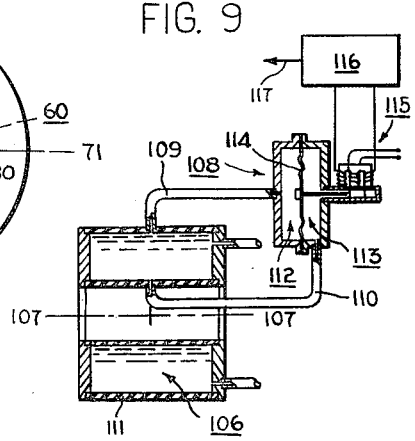
FIG. 9
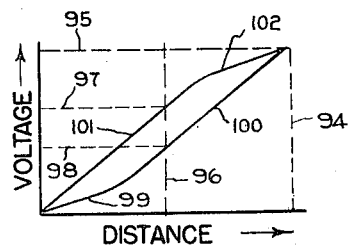
FIG. 7
FIG. 8
INVENTOR.
PAUL F. MAEDER
BY
Dike, Thompson & Bronstein
ATTORNEYS United States Patent Office 2,949,784
Patented Aug. 23, 1960

2,949,784
GYROSCOPE DEVICE

Paul F. Maeder, East Providence, R.I., assignor to Speidel Corporation, Providence, R.I., a corporation of Rhode Island Filed May 26, 1959, Ser. No. 815,954

18 Claims. (Cl. 74—5.7)

The present invention relates to gyroscopic apparatus and, in one particular aspect, to improved inertial devices including electromagnetically-driven liquid rotors developing gyroscopic inertia.

In conventional gyroscope construction, a relatively massive rotor element which has been subjected to precise dynamic balancing is mounted within a balanced inner frame or gimbal for low-friction high-speed rotation about a spin axis under driving influence of electric or pneumatic motive equipment, the inner gimbal, in turn, being suspended about an axis normal to the spin axis, either within a support frame or outer gimbal, depending upon whether the device is to comprise a single-axis rate or a three-degree-of-freedom attitude gyroscope. Those versed in this art are acquainted with the extraordinary care and cost involved in the design, manufacture and assembly of the various components of such gyroscopes in efforts to avoid static weight, to suppress friction, and otherwise to realize maximum gyroscopic stability and minimize erroneous precessions. Bearing difficulties are outstanding, inasmuch as the rotor structure and gimbal bearings which must both carry substantial loads should also nevertheless possess extremely low friction, and these two requirements are not fully compatible through practice of known manufacturing techniques. Further, serious errors may be induced as the result of valueless inertia and unbalance in movable parts, or because of windage effects and dimensional fluctuations with temperature. In the case of electrically rotated gyroscopes, the special rotor motor construction generally represents an expensive design departure, structurally, from its counterpart in more simple applications and must also be energized through couplings which adversely tend to introduce friction or torque about sensitive axes.

Difficulties of the aforesaid character may be vastly reduced, and certain of them entirely avoided, in a unique construction which involves a confined conductive liquid rotor material as the sole rotating component, wherein the liquid rotation is imparted through electromagnetic action realized with simple electromagnetic structure, and wherein sensitive detections of rates of turn about predetermined axes are advantageously achieved without error induced by inertia of parts and by acceleration effects other than those in directions of interest. By way of distinction, such gyroscopic apparatus as has heretofore been proposed utilizing moving fluid streams has required external fluid circulating equipment having the usual bearings or also has other conventional gyroscope features of the aforementioned limited character.

Accordingly, it is one of the objects of the present invention to provide improved gyroscopic apparatus having conductive liquid rotors in which electromagnetically-developed Coriolis forces occasion useful sensitivities to angular velocities about predetermined measurement axes.

A further object is to provide improved electromagnetic structure having a confined liquid rotor as the only rotating component thereof and generating hydrodynamic forces which are detectable to characterize rates of turn without error due to accelerations unrelated to measured conditions.

It is another object to provide simplified and accurate gyroscopic apparatus involving effects of Coriolis forces produced within rotating liquid and adapted to low-cost manufacture in miniature size and weight.

A still further object is to provide improved gyroscopic apparatus wherein detection responsive to hydrodynamic effects within a confined and electromagnetically-rotated small annulus of electrically conductive fluid provides fast response and accurate measurement of angular velocities only about predetermined measurement axes.

By way of a summary account of practice of this invention in one of its aspects, apparatus is constructed employing a motive arrangement having certain features similar to those of an electrical motor stator, in that an annular stator core and associated distributed A.-C. electrical winding array produces an apparently-rotating radial magnetic field pattern. Centrally within this outer annular electromagnetic assembly is disposed a cylindrical element of magnetic material which affords flux return paths and which is spaced from the outer annular assembly by a radial gap axially closed at each end to confine liquid mercury therein in a full annulus. Alternating magnetic flux generated by the stationary electromagnetic structure traverses the mercury annulus radially and induces eddy currents therein which are caused to flow in preferred directions by stationary conductive current collectors. The impressed alternating magnetic flux appears to rotate about the longitudinal axis of the mercury annulus, due to phase displacements, and the interactions between this flux and the magnetic flux attending the induced eddy currents in the mercury interact to develop torques which spin the mercury about the longitudinal axis at speeds occasioning desired tendencies of the mercury to remain spinning in a fixed circular path. As the structure confining the mercury is displaced about an axis normal to the axis of spin, significant changes in internal pressures of the mercury are produced. Instantaneous hydrodynamic pressures at diametrically opposite positions laterally of the liquid mercury annulus are communicated by mercury-filled conduits to opposite sides of a movable diaphragm of a differential pressure sensor, the diaphragm structure being neutrally suspended in the mercury and the displacements thereof being translated into electrical output signals.

Although the features of this invention which are believed to be novel are set forth in the appended claims, the details of preferred embodiments of the invention and the further objects and advantages thereof may be readily comprehended through reference to the following description taken in connection with the accompanying drawings, wherein:

Figure 1 presents a side view of a rate-of-turn apparatus embodying teachings of this invention, with the electromagnetic and fluid confining structure viewed in a longitudinal cross section;

Figure 2 illustrates pictorially an end view of the apparatus of Figure 1;

Figure 3 provides a cross sectioned view of a differential pressure sensor and electrical translating unit suitable for use with the equipment of Figures 1 and 2;

Figure 4 illustrates a further embodiment of differential pressure sensor and electrical translating unit in association with a signal utilization device;

Figure 5 depicts a longitudinal cross section of part of a rate-of-turn device including a motive arrangement producing torques through interaction of effects of an applied magnetic field and applied electrical currents;

Figures 1, 2, 3:
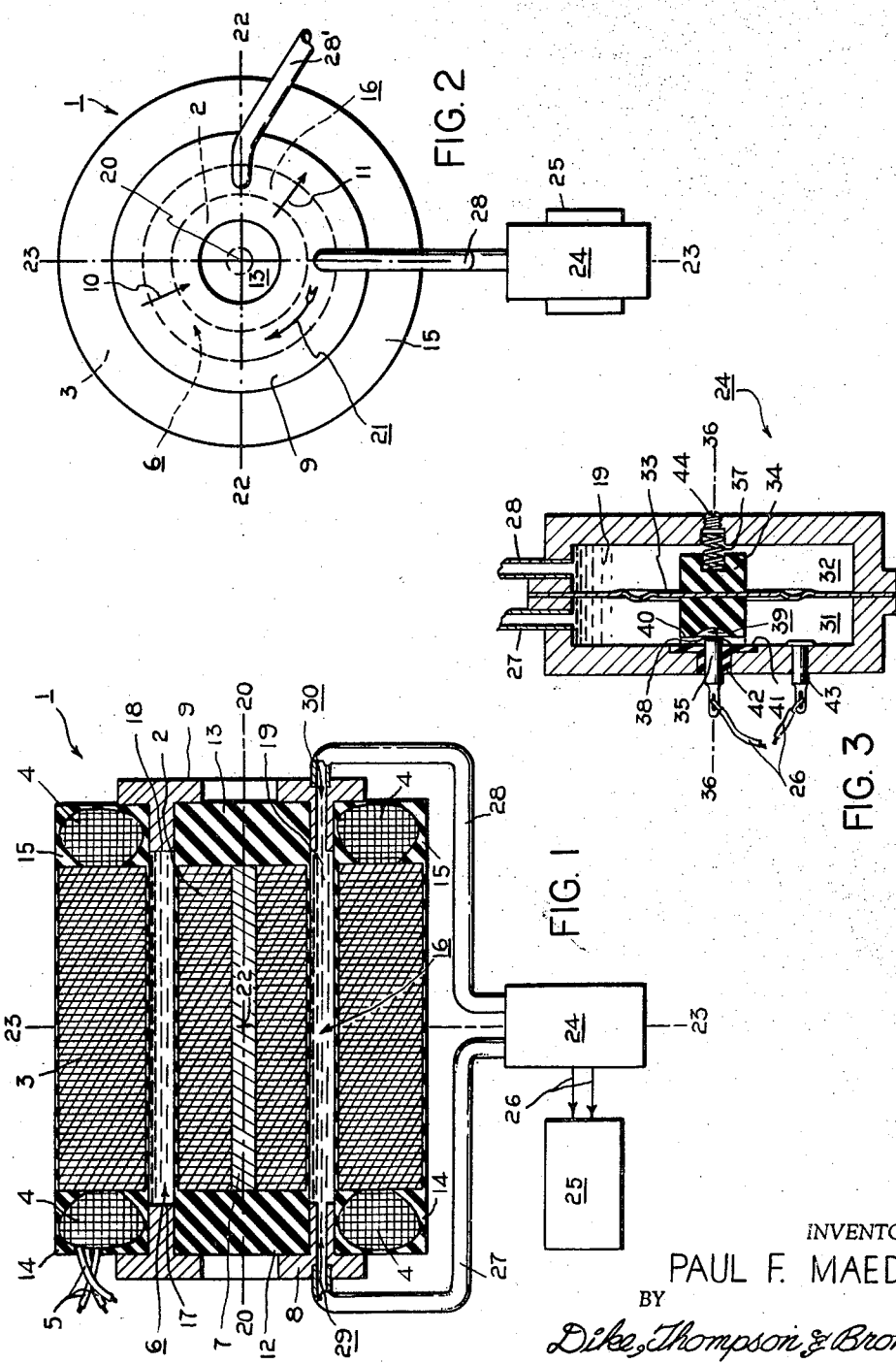

Figure 6 presents an end view of the structure of Figure 5;

Figure 7 is a cross section longitudinally through a liquid confining unit of a rate-of-turn device directly producing characterizing electrical output signals;

Figure 8 provides a graph of voltage versus longitudinal distance through a rotating liquid annulus such as that of Figure 7; and Figure 9 represents portions of an angular acceleration apparatus provided with compensation for varying speeds of liquid spin.

Having reference to the portrayal of embodying equipment in Figures 1 and 2, it will be perceived that a detector unit 1 includes inner and outer stacks of laminations of magnetic material designated by reference characters 2 and 3, respectively. The outer stack of laminations 3 is of annular configuration and has associated therewith electrical windings distributed in the manner of conventional alternating current motor stator windings and exhibiting end turns 4 in the cross sectioned view. For the production of important motive effects described later herein, these electrical windings are electrically excited by way of electrical couplings 5 such that polyphase magnetic flux fields will be generated. Suitable alternating current electrical excitation of different phases may be derived from a polyphase source or through known phase-splitting circuitry. Cylindrical lamination stack 2 is disposed coaxially within the outer winding and core assembly and is of a diameter sufficiently reduced from that of the inner periphery of lamination stack 3 to occasion an annular gap 6 therebetween. Central longitudinal stud 7 serves to stake the inner laminations 2 fixedly together, and end plates 8 and 9 assist in preserving the aforesaid coaxial relationship and a substantially uniform radial thickness of the gap 6. Alternating magnetic flux developed as a consequence of the electrical winding excitation selects preferred low reluctance flow paths including the material of both inner and outer laminations 2 and 3 and thus traverses the annular gap 6 in substantially radial directions such as those designated by arrows 10 and 11 in Figure 2. In a known form of alternative stator construction, the distributed electrical windings may be associated with the inner lamination stack 2, rather than with the outer lamination stack 3, with like results.

Both the cylindrical inner lamination assembly and the concentric outer annular lamination and winding assembly are shown to be encapsulated by cast resin, such as an epoxy resin, for protection of the windings and laminations as well as for providing convenient mounting structure. In the case of the inner lamination stack, the protective encapsulating material not only provides a thin smooth sheath about the cylindrical stack but also projects axially outward from both ends thereof to form two relatively thick insulating end caps 12 and 13. Similarly, the outer annular laminations 3 are smoothly sheathed, and the winding end turns 4 are encased by the insulating plastic to form rigid annular end caps 14 and 15 which extend axially beyond laminations 3 for an appreciable distance for mounting purposes. Annular end plates 8 and 9 are disposed and tightly sealed within the spaces between the coaxial end pieces 12 and 14 and the coaxial end pieces 13 and 15, to maintain the annular gap 6 between inner and outer magnetic cores and to seal this gap at its ends and thereby form a liquid-tight annular chamber 16. It is important to most efficient electromagnetic operational characteristics of the device that the conductive end plates 8 and 9 do not, however, project into the radial spaces between the inner and outer laminations themselves where sizable eddy currents might be induced. Instead, the axially innermore surfaces 17 and 18 of these plates which border the chamber 16 are located beyond the axial extremities of the lamination stacks.

The annular chamber 16 formed by this structure, and radially traversed by apparently-rotating alternating magnetic flux, is substantially filled with an electrically conductive liquid 19, preferably a dense liquid such as mercury which is conveniently molten in the wide range of temperatures from —38.8° C. to+356.7° C. This liquid has eddy currents induced therein by the applied magnetic flux and, in turn, the induced currents develop magnetic fields the interactions of which with the applied magnetic fields result in net torques upon the liquid in one angular direction about the longitudinal axis 20—20. Arrow 21 in Figure 2 characterizes the angular direction of rotation of the mercury within chamber 16 for an assumed condition of clockwise apparent rotation of the applied magnetic field as viewed in this figure. Axis 20—20 is thus not only the central longitudinal axis for the elements of the electromagnetic structure but also comprises the spin axis of the mercury annulus.

When the mercury annulus is caused to rotate in the aforesaid manner and the entire structure is supported without experiencing angular velocities about axes normal to the spin axis 20—20, the hydrodynamic pressures appearing in the vicinity of the axial end surfaces 17 and 18 are substantially the same. Measurement of these instantaneous pressures at the axially opposite positions would thus exhibit no net difference between them. However, the spinning annulus of mercury possesses inertial characteristics such that each unit volume thereof tends to rotate in a plane normal to the spin axis and to remain in such a plane of rotation despite transient angular movements of the confining structure about such axes normal to the spin axis as the illustrated axes 22—22 and 23—23. It thus occurs that, upon such angular movements of the confining structure, the spinning liquid develops hydrodynamic pressures at various positions which are different from those pressures appearing at the same positions under static conditions of the confining structure. Depending upon appropriate selection of positions at which instantaneous pressures are measured, the sense and magnitude of rate of turn or angular velocity of movement of the structure may be characterized, as by instantaneous differential pressures.

The sensing of pressures is preferably and conveniently performed by a differential pressure detector unit 24, which also serves the function of translating its detections into characterizing electrical signals applied to an appropriate signal utilization device 25 way of electrical coupling 26. Sensor 24 responds to instantaneous pressures at two displaced positions near axially opposite ends of chamber 16 which are also radially aligned about the spin axis 20—20. This response is enabled by the coupling conduits 27 and 28 which are associated with different portions of the sensor 24 and which communicate with the mercury within chamber 16 through small bores 29 and 30, respectively, in the end plates 8 and 9. The angular orientation of axially aligned bores 29 and 30 is substantially in a plane which is normal to the sensing axis 22—22, and these aligned bores are also displaced from this sensing axis by substantially the median radius of the annulus. While the pressures in the immediate vicinity of these bores remain substantially equal under the condition of no angular movement of the structure about axis 22—22, the mercury annulus tends to remain fixed in its rotation upon occurrence of angular movement about axis 22—22 and occasions differential pressures at the measurement positions. If, for example, the movement of the confining structure is in the clockwise direction about axis 22—22, the pressure in the vicinity of bore 30 will increase and that in the vicinity of bore 29 will decrease. Angular movement in the opposite direction reverses the effects such that the pressures near bore 29 are increased and those near more 30 are decreased, and, in each instance, the rate of turn experienced instantaneously will govern the magnitude of the difference between pressures at these positions. Differential pressure sensor 24 is thus enabled to characterize not only the magnitude of the rates of turn but also their angular sense.

In the same apparatus, response may be had also to the rates of turn about sensing axis 23—23, which is mutually perpendicular both to the spin axis 20—20 and the aforementioned sensing axis 22—22. Differential pressures which characterize the direction and rate of turn about this further axis are preferably sensed in the same manner, although by way of conduits, such as conduit 28', which are disposed at axially opposite ends of the annulus at a position 90° removed from the orientation of axis 23—23 about spin axis 20—20. It will be understood that conduit 28', and its companion conduit, not illustrated, are likewise associated with differential pressure sensor and signal utilization equipment in the same manner as are conduits 27 and 28.

It should be noted that the pressure-transmitting conduits and communicating bores are entirely filled with the same conducting liquid 19 which rotates within chamber 16. The pressure sensor 24 as represented in Figure 3 is similarly filled in the two compartments 31 and 32 separated by a movable flexible diaphragm member 33. Differences in the liquid pressures transmitted to the compartments 31 and 32 occasion diaphragm displacements and advantageously shift the position of an insulating control element 34 carried centrally of the diaphragm in relation to an electrical contact 35. Element 34 is selected and arranged to possess substantially the same net density as the liquid 19 it displaces, whereby it is neutrally suspended in the liquid and remains undisturbed by forces of acceleration which may be sensed by it, particularly in directions along its displacement axis 36—36. Insulating control element 34 is continuously resiliently biased by spring 37 toward the dashed-line orientation 38 thereof in the Figure 3 illustration, at which orientation the exposed head of insulated contact 35 within compartment 31 is entirely enclosed within the accommodating depression 39 in movable element 34. Under conditions of zero differential pressure, spring 37 forces the end surface 40 of control element 34 against the planar surface 41 of the insulating member 42 about contact 35 and thereby physically and electrically isolates contact 35 from the conducting liquid 19 and, therethrough, the cooperating electrical contact 43. Coupling leads 26 then are electrically disconnected, and the signal utilizing device which they served is informed that the pressure in compartment 31 over that of compartment 32 does not exceed a predetermined value and, therefore, that the sensed rate of turn about axis 22—22 does not exceed a predetermined rate in the counterclockwise direction. When this rate of turn and pressure value are exceeded, the diaphragm 33 and control element are forced to the right against restraint of adjustable spring 34, as in the full-line illustration, and conductive mercury completes a low-resistance electrical connection of contacts 35 and 43. The intercoupled signal utilization device then responds to the circuit connection which is completed in this manner. The rates of turn at which responses are obtainable may be adjusted through manipulation of adjusting screw 44 associated with biasing spring 34. Rate of turn in the opposite angular direction, clockwise about axis 22—22, must be sensed and translated by a second sensor in which the construction may be the same as that exposed in Figure 3 except that the inlet positions of conduits 27 and 28 are reversed such that they communicate with compartments corresponding to 32 and 31, respectively. Two such sensors yield full information as to direction of angular movement about axis 22—22. Like equipment employed with conduit 28' and its companion conduit characterizes the directions and rates of turn about sensing axis 23—23.

The form of differential pressure sensor and signal translator unit 24 portrayed in Figure 4 desirably affords a response which characterizes both the instantaneous directions and rates of turn about its associated sensing axis. This unit also includes a pair of liquid-filled compartments, 45 and 46, separated only by a thin diaphragm or membrane, 47, which supports a control assembly 48 including an affixed armature 49 slidable along axis 50—50 in response to differentials in pressures appearing between compartments 45 and 46. A spring element 51 adjustable through manipulation of adjusting screw 52 in this instance assists in biasing the diaphragm and its movable attachments to an important null or neutral position along the displacement axis 50—50, although it will be understood that its function may be wholly exercised by the member 47 itself in other constructions. The armature and other portions of the movable assembly are neutrally suspended in liquid 19, such that their mass is substantially equal to that of the liquid which they displace, and the movable assembly thus cannot become erroneously displaced through response to applied environmental accelerations rather than through response to differential pressures. Armature 49, which is constructed of magnetic material, is slidable within a sealed non-magnetic tube 53 fixed with the sensor casing 54 and is disposed proximately with the legs of an E-shaped core 55 mounted on the exterior of casing 54. In a null position occasioned by the null orientation of its driving membrane 47, armature 49 occupies a central symmetrical location in relation to the legs of core 55 and causes magnetic flux originating with center-leg winding 56 to divide equally between the outer legs and, thereby, to induce equal voltages in the output windings 57 and 58 of these outer legs. The voltages induced in output windings 57 and 58 are opposed, through appropriate direction of winding on the core legs and through appropriate series interconnection thereof, such that only the differences between these two voltages appear across leads 26 and the input to signal utilization device 25. Electrical excitation of winding 56 is by way of alternating current source terminal 59, and the arrangement is in general that of a differential variable reluctance transducer. Increased pressure in compartment 45 over that of compartment 46 develops displacement of membrane 47 and armature 49 to the right, whereby a greater amount of A.-C. magnetic flux is shunted through winding 58 and a lessened amount through winding 57, with the result that the net signal appearing across input coupling leads 26 is of one polarity and is of a magnitude characterizing the extent of displacement and, hence, the rate of turn of the apparatus counterclockwise about sensing axis 22—22. The effects are similar, though reversed, for turns in the opposite direction, and the electrical output thus characterizes both the directional sense and angular rate of turn, in a proportional manner. Device 25 then may respond to such output by providing related control or indication, in a known manner. A second unit like that depicted in Figure 4 will afford like information concerning angular movements about the further sensing axis 23—23 90° displaced from axis 22—22.

It will be recognized that the pressures experienced in a liquid confined within an enclosure will be influenced by accelerations in directions other than those of desired measurement, and it would be expected that adverse responses to such accelerations would be encountered and could introduce intolerable errors. By way of illustration, accelerations aligned with spin axis 20—20 will develop differences in pressures between the axial ends of the mercury annulus, as when the spin axis is oriented vertically and the acceleration of gravity is present along this axis. It is important, therefore, that the construction and arrangement of the sensor and translator apparatus 24 in both of the embodiments which have been shown provide full independence from such undesired effects. This independence accrues from the balancing of hydrostatic forces at the site of the diaphragm or membrane element, in each instance. Compartments on each side of the membrane, as well as the coupling conduits communicating with the liquid annulus, are entirely filled with the same liquid as that of the spinning annulus, and, hydrostatically, the effects are the same as they would be if the membrane were not present. That is, except for the desired hydrodynamic effects of the spinning liquid, there is equilibrium at each position within the closed liquid loop including the liquid annulus, the two conduits, and the sensor compartments. As in any closed loop or circuit of liquid, the pressure heads continuously counterbalance one another, including those pressure heads developed by fluid inertia as externally applied accelerations are experienced. The situation is advantageously altered when pressures are applied through the aforesaid loop in one net direction as a consequence of inertia effects developed by the spinning liquid annulus, however, and, as has been described, the angular movements about the sensing axes will usefully deflect the sensor membrane and occasion meaningful output signals. For kindred reasons, the movable membrane and associated contact element or armature structure must have the aforementioned neutral suspension in the liquid, whereby accelerations are prohibited from causing erroneous deflections and outputs.

Maximum motive torques are realized when the induced eddy currents in the conductive liquid annulus of an arrangement such as that of Figures 1 and 2 are enabled to traverse closed loops through the external low-resistance annular end plates 8 and 9 which serve as current busses. These busses, which also conveniently form part of the liquid-confining structure and are in low-resistance electrical contact with the liquid 19, provide paths through which the induced eddy currents may flow before completing their course through the liquid, and the induced current flow paths through the liquid then tend to be in directions yielding liquid-accelerating torques in one net angular direction. Otherwise, the eddy currents would tend to swirl within the fluid in paths creating motive torques in both angular directions about the spin axis, and motive efficiency would be lessened. Losses in the useful applied magnetic excitation flux are minimized, and electromagnetic efficiency heightened, by the displacement of bus ends 17 and 18 axially beyond the core laminations 2 and 3, where wasteful currents directly induced by the applied fields are minimal.

Bearings and conventional rotating elements are entirely eliminated in the described apparatus, the magnetic core structure and electrical winding arrangement of the motive portions are of a form readily lending themselves to economical manufacture employing common techniques, and the apparatus may also be made in very small size and weight. Communicating conduits 27 and 28 and bores 29 and 30 possess passageways which are of ample cross-section to avoid disturbing capillary effects with the liquid which is used. Undue adhesion of the liquid to surfaces of the confining structure is resisted by forming these surfaces smoothly, and, in the case of the plastic sheathing of the lamination stacks, the plastic material may itself tend to resist such adhesion, as when mercury is employed. Such friction effects as are developed aid in restoring the spinning liquid to symmetrical relationship with its confining structure following turns, these effects being in addition to the substantial slaving influences of the motive field which rapidly cause the spinning liquid to follow its displacements although permitting a lag needed to develop the output signals.

Differential hydrodynamic pressures of appropriate characteristics are obtainable not only at the axially aligned positions shown in connection with the apparatus of Figures 1 and 2 but also at diametrically aligned positions at one axial location, as at the outermore axial end of the liquid annulus 60 in Figures 5 and 6. The latter construction involves a generally cylindrical electromagnetic core 61 of E-shaped cross-section having an annular electromagnet winding 62 recessed therein about the center core leg 63, this winding being energized with current by way of leads 64 from an electrical source. Radial magnetic flux is developed between the inner core leg 63 and the concentric outer annular core member 65, as is characterized by arrows 66 in Figure 6, and the annulus 60 of electrically conducting liquid 67 is in this radial field. Motive power for spin of the liquid annulus in this device is achieved through interactions of the radial magnetic flux with the fields produced by electric current forced axially through electrically conductive liquid 67 by source leads 68 connected with the liquid by conductive end busses 69 and 70 which are part of the liquid-confining unit. Sources associated with both leads 64 and 68 are direct current sources, although both may also comprise alternating current sources of substantially the same frequency and fixed phase relationship. Resulting torques tend to accelerate the liquid annulus 60 to a speed of rotation about spin axis 73—73 in one direction indicated by arrow 76 which occasions desired inertia for creation of differential pressures upon occurrence of angular movements about the sensing axis 71—71. Conduits 72 and 77, which are aligned with one diameter of the structure, sense the pressures at the same axial end of the rotating annulus in the immediate vicinity of the bores 74 and 75 through end plate and bus 70. Counterclockwise angular movement about axis 71, in Figure 5, results in an increase in pressure in conduit 72 over that in conduit 77, and clockwise movement results in reversal of the differences in pressures, whereby a sensor and translator such as that shown in either Figure 3 or 4 will respond to the differences by producing intelligence outputs characterizing the rates of turn experienced. Rates of turn about sensing axis 78—78 will produce comparable effects through conduits 79 and 80 which lie along a diameter perpendicular to that of the conduits 72 and 77.

The effects of rapidly spinning conductive liquid also yield varying resistivity characteristics which may be advantageously exploited for the purpose of obtaining electrical output directly tapped from the rotating annulus. One arrangement operating in accordance with such principles appears in Figure 7, the physical structure there being portrayed without the associated magnetic-field-producing portions and including an annulus 81 of conducting liquid 82 which is confined within a hollow annular assembly. The latter includes outer and inner cylindrical insulating rings 83 and 84 which are disposed concentrically about the spin axis 85—85, and annular conducting end plates 86 and 87 to which electrical signals are applied from A.-C. or D.-C. source terminals via leads 88. Because of the back E.M.F.'s developed within the rotating conductive liquid, that liquid which rotates faster offers greater effective electrical resistance, and the voltage drops axially across the liquid may vary irregularly under angular movement conditions. With the liquid annulus closed to spin in a manner already discussed, and without a turning being sensed about axis 89, the voltage drops axially across the annulus caused by the impressed signals from leads 88 are uniformly distributed. The voltages tapped from aligned electrically conducting probes 90 and 91 contacting the liquid are then equal. Assuming the existence of a counterclockwise angular movement of the supporting structure about axis 89, however, the faster-rotating liquid will be relatively displaced because of its inertia and will occupy the cross-shaded regions 92 and 93. The remaining regions of the liquid annulus, which are not shaded, are instantaneously slower-moving, in part due to viscous drag effects, and possess lesser resistivity at the same moment. These instantaneous characteristics are approximated by the graphical representation of Figure 8, wherein the abscissa is in terms of axial distance across the annulus and the ordinate is in terms of voltage occasioned by the applied signals. At the right-hand axial end of the annulus, distance 94 from the left-hand end, the full voltage drop 95 is of course present. At the position 96, however, the higher voltage 97 is tapped by probe 91 while the lower voltage 98 is tapped by probe 90, and the sense and magnitude of the difference between these voltages characterizes the sense and rate of angular movement of the sensing axis 89. Curve portion 99, which is a relatively low slope, indicates the relatively low incremental resistance of slower-moving liquid in the unshaded part of the annulus diametrically nearer probe 90, while curve portion 100 possesses a steeper slope occasioned by the higher resistance of the faster-moving liquid. The curve section 101 of the second curve has the steeper slope related to higher resistance of faster-moving liquid nearer the left-hand end of the part of the annulus diametrically nearer probe 91, while the curve section 102 has the lower slope occasioned by the slower-moving liquid axially nearer the right lower end of the annulus. The tapped output signals are applied to a signal utilization device 104 by couplings 105 where they initiate control or indication in known ways. It will also be perceived that the critically shifting areas of greater and lesser electrical conductivity will cause magnetic fields to be developed out of coaxial symmetry with the supporting structure, whereby they are in position to be intercepted by and to introduce characterizing signals in proximate electrical output windings.

In those applications where the precise value of rate of angular movement is important, rather than simply a general response to the existence and sense of turn, it is necessary either that the rate of spin of the liquid be preserved substantially constant, as by insuring that the electrical excitation does not drift, or that a compensation be introduced. The latter may be readily and uniquely achieved in the rotating liquid device through response to pressures developed by centrifugal forces, these being related to rotational speed of a given liquid spinning within a predetermined enclosure. Signals responsive to such pressures may conveniently vary attenuations of the turn-responsive output signals or may regulate the electrical excitation of the apparatus in a compensating manner. Referring to the Figure 9 illustration, for example, the confined liquid annulus 106 is rotatable about the spin axis 107—107 and, at a specific angular speed, establishes a predetermined differential of pressures between its inner and outer peripheries due to centrifugal effects. This differential pressure varies with the angular speed, and departures from an established value are detected by a differential pressure sensor 108 of construction and arrangement comparable to that illustrated in Figure 4. Coupling conduits 109 and 110 communicate the liquid pressures in the vicinity of the outer and inner peripheries of the annulus structure 111 with the sensor chambers 112 and 113, respectively, which are divided by flexible diaphragm 114, and these elements are liquid-filled. For reasons already presented in connection with discussions of the embodiments of sensor 24, the diaphragm 114 and the movable armature 115 thereof are neutrally suspended in the liquid. Electrical output signals proportional to rotational speeds of the liquid annulus 106 are derived from the differential variable reluctance transducer 115, which is similar to the corresponding transducer portrayed in Figure 4, and these signals are applied to a control unit 116, the output of which is applied over coupling 117 to regulate the output of the angular motion apparatus. Those versed in the art will appreciate that control unit 116 may, for example, comprise a servo amplifier and servo motor unit which produces a mechanical output positioning a voltage regulator which variably energizes the motive electromagnet windings 4 or 62 or the transducer exciting windings 56, or may comprise a variable impedance element which modifies the electrical output from output windings 57 and 58 in Figure 4. As speed of liquid spin increases beyond a desired value, the motive excitation is lowered or the output signals are more attenuated, to provide the desired compensation, with the influences being reversed for decreases in speed.

It should be understood that the specific embodiments of this invention disclosed herein are of a descriptive rather than a limiting character and that various changes, combinations, substitutions or modifications may be employed in accordance with these teachings without departing in spirit or scope from this invention in its broader aspects.

What I claim as new and desire to secure by Letters Patent of the United States is:

1. Apparatus responsive to angular movement comprising a structure having a liquid-tight hollow chamber therein, an electrically conductive liquid confined within said chamber, electrical motive means consisting of stationary parts rotating said liquid within said chamber about a spin axis, said motive means including means directing magnetic flux through said conductive liquid to develop liquid-accelerating torques, and means producing output signals characterizing instantaneous inertial tendencies of said liquid to rotate about said spin axis upon occurrence of relative angular movement of said structure about a sensing axis normal to said spin axis.

2. Apparatus responsive to angular movement comprising a structure having a liquid-tight hollow chamber therein of generally circular outline, an electrically conductive liquid confined within and filling said chamber, electrical motive means consisting of stationary parts and impelling said liquid in circular paths within said chamber concentrically in relation to said generally circular outline thereof, said motive means including means directing magnetic flux through said conductive liquid to develop liquid-accelerating torques, and means producing output signals characterizing instantaneous inertial tendencies of said liquid to rotate about a spin axis of fixed attitude upon occurrence of relative angular movement of said structure about a sensing axis normal to said spin axis.

3. Apparatus responsive to angular movement comprising a structure having a liquid-tight hollow annular chamber therein, an electrically conductive liquid filling said chamber to form a liquid annulus, electrical motive means consisting of stationary parts rotating said liquid annulus, said motive means including means directing magnetic flux through said liquid annulus to develop liquid-accelerating torques, and means producing output signals characterizing instantaneous inertial tendencies of said liquid annulus to rotate about a spin axis of fixed attitude upon relative angular movement of said support about an axis normal to said spin axis.

4. Apparatus responsive to angular movement comprising a liquid-tight structure having an elongated hollow annular chamber therein, an electrically conductive liquid filling said chamber to form an axially elongated liquid annulus, electrical motive means consisting of stationary parts rotating said liquid annulus, said motive means including magnetic means directing magnetic flux substantially radially through said liquid annulus to develop liquid-accelerating torques, and means producing output signals characterizing instantaneous inertial tendencies of said liquid annulus to rotate about a spin axis of fixed attitude upon relative angular movement of said structure about an axis normal to said spin axis.

5. Apparatus responsive to angular movement comprising a liquid-tight structure having an elongated annular chamber therein, an electrically conductive liquid filling said chamber to form an axially elongated liquid annulus, electrical motive means consisting of stationary parts rotating said liquid annulus, said motive means including alternating current electromagnetic means directing apparently-rotating alternating magnetic flux substantially radially through said liquid annulus, said magnetic flux generating eddy currents within said liquid in directions to develop net torques in one angular direction within said annulus, and means producing output signals characterizing instantaneous inertial tendencies of said liquid annulus to rotate about a spin axis of fixed attitude upon relative angular movement of said structure about an axis normal to said spin axis.

6. Apparatus repsonsive to angular movement comprising a structure having a liquid-tight and axially elongated hollow annular chamber therein, an electrically conductive liquid filling said chamber and forming a liquid annulus, said structure including an annular core of magnetic material and a coextensive substantially cylindrical inner core of magnetic material disposed coaxially outside and inside, respectively, of said liquid annulus, and a pair of electrically conductive busses disposed one at each axial end of said annulus in electrical contact with said liquid, electromagnet winding means excited with alternating current and directing apparently-rotating alternating magnetic flux substantially radially through said liquid annulus between said cores, said magnetic flux generating eddy currents within said liquid and directed by said busses through said liquid in direction to develop net torques rotating said liquid in one angular direction within said annular chamber, and means producing output signals characterizing instantaneous inertial tendencies of said liquid annulus to rotate about a spin axis of fixed attitude upon relative angular movement of said structure about an axis normal to said spin axis.

7. Apparatus responsive to angular movement comprising a structure having a liquid-tight and axially elongated hollow annular chamber therein, an electrically conductive liquid filling said chamber and forming a liquid annulus, said structure including magnetic core material extending coaxially inside and outside of said liquid annulus, and a pair of electrically conductive contacts disposed one at each axial end of said annulus in contact with said liquid, electromagnet winding means energized to direct magnetic flux substantially radially through said liquid annulus between said cores, means electrically exciting said contacts to force electrical currents in substantially axial directions through said liquid annulus, said magnetic flux and electrical currents through said liquid developing net torques rotating said liquid in one angular direction within said annulus, and means producing output signals characterizing instantaneous inertial tendencies of said liquid annulus to rotate about an axis of fixed attitude upon occurrence of relative angular movement of said structure about an axis normal to said spin axis.

8. Apparatus responsive to angular movement comprising a structure having a hollow liquid-tight chamber therein, an electrically conductive liquid filling said chamber, electrical motive means consisting of stationary parts rotating said liquid within said chamber about a spin axis, said motive means including means directing magnetic flux through said conductive liquid, a differential pressure sensor having a movable member therein separating two compartments, hollow conduit means coupling each of said compartments with said chamber each at a different position at which different instantaneous pressures are developed within said liquid upon occurrence of angular movement of said structure about an axis normal to said spin axis, said conduits and compartments being filled with said liquid whereby said member is insensitive to accelerations in directions other than about an axis normal to said spin axis, and output signal means responsive to displacements of said movable member.

9. Apparatus responsive to angular movement comprising a structure having a hollow liquid-tight chamber therein, an electrically conductive liquid filling said chamber, electrical motive means consisting of stationary parts rotating said liquid within said chamber about a spin axis, said motive means including means directing magnetic flux through said conductive liquid, a differential pressure sensor having a movable member therein separating two compartments, means mounted with said movable member for signalling displacements thereof, hollow conduit means coupling each of said compartments with said chamber each at a different position at which different instantaneous pressures are developed within said liquid upon occurrence of angular movement of said structure about an axis normal to said spin axis, said conduits and compartments being filled with said liquid, said movable member and said signalling means movable therewith being substantially neutrally suspended within said liquid in said sensor compartments, whereby said movable member and signalling means are actuated responsive only to movements of said structure about an axis normal to said spin axis, and means responsive to movements of said signalling means producing output signals characterizing said angular movement.

10. Apparatus as set forth in claim 9 wherein said chamber is of annular configuration and said rotated liquid therein forms a spinning liquid annulus, and wherein said liquid-filled conduits communicate with said annular chamber at opposite axial ends thereof at positions in axial alignment.

11. Apparatus as set forth in claim 9 wherein said chamber is of annular configuration and said rotated liquid therein forms a spinning liquid annulus, and wherein said liquid-filled conduits communicate with said annular chamber at diametrically displaced positions at one axial end thereof.

12. Apparatus as set forth in claim 9 comprising a first electrical coupling with said liquid, and a second electrical coupling including a partly insulated electrical contact disposed within one of said compartments, and wherein said signalling means mounted with said movable member comprises an insulating element shaped and disposed to physically and electrically isolate said contact from said liquid and to expose said contact to said liquid, depending upon the orientation of said element by said movable member.

13. Apparatus as set forth in claim 9 wherein said signalling means mounted with said movable means comprises an armature of magnetic material disposed within said liquid in said sensor, and wherein said output signal producing means includes electrical core and winding means disposed outside said liquid in cooperative relationship with said armature to have electrical output signals thereof controlled by said armature.

14. Apparatus responsive to angular movements comprising a structure having a liquid-tight and axially elongated hollow annular chamber therein, liquid mercury filling said chamber and forming a liquid mercury annulus, said structure including a stack of annular magnetic laminations and a coextensive stack of substantially cylindrical magnetic laminations disposed coaxially outside and inside, respectively, of said mercury annulus, and a pair of electrically conductive busses disposed one at each axial end of said mercury annulus in electrical contact with said mercury and axially displaced outwardly beyond said coextensive lamination stacks, electromagnet winding means mounted with one of said lamination stacks and excited by polyphase alternating current signals to direct apparently-rotating alternating magnetic flux substantially radially through said mercury annulus between said lamination stacks, said magnetic flux generating eddy currents within said mercury and directed by said busses through said mercury in directions to develop net torques rotating said mercury in one angular direction within said annular chamber about a spin axis, a differential pressure sensor having movable membrane means therein separating two compartments, hollow conduit means coupling each of said compartments with said annular chamber each at a different position at which different instantaneous hydrodynamic pressures are developed within said rotating mercury upon occurrence of angular movement of said structure about a sensing axis normal to said spin axis, said conduits and compartments being filled with liquid mercury whereby said membrane means is insensitive to accelerations in directions other than about said sensing axis, and output means producing output signals responsive to displacements of said membrane means.

15. Apparatus as set forth in claim 14 further comprising a second differential pressure sensor having second membrane means therein separating two compartments, and hollow conduit means coupling each of said compartments of said second sensor with said annular chamber each at a different position at which different instantaneous hydrodynamic pressures are developed within said rotating mercury upon occurrence of angular movement of said structure about a second sensing axis normal to said spin axis and said sensing axis, said conduits and compartments being filled with mercury whereby said second membrane means is insensitive to accelerations in directions other than about said second sensing axis, and second output means producing output signals responsive to displacements of said second membrane means.

16. Apparatus responsive to angular movement comprising a structure having a hollow liquid-tight chamber therein, an electrically conductive liquid filling said chamber, electrical motive means consisting of stationary parts rotating said liquid within said chamber about a spin axis, said motive means including means directing magnetic flux through said conductive liquid to develop liquid-accelerating torques, electrical means applying voltage across said liquid to occasion voltage drops therethrough in axial directions substantially parallel with said spin axis, and at least one pair of electrically conductive probes each electrically contacting said liquid at displaced angular positions about said spin axis radially removed from said spin axis, whereby the differences between instantaneous voltages appearing at said probes characterize angular movements of said structure about a sensing axis normal to the spin axis of said liquid in response to differences in effective resistance of faster-rotating and slower-rotating liquid.

17. Apparatus responsive to angular movement comprising a structure having a hollow liquid-tight chamber therein, an electrically conductive liquid filling said chamber, electrical motive means consisting of stationary parts rotating said liquid within said chamber about a spin axis, said motive means including means directing magnetic flux through said conductive liquid to develop liquid-accelerating torques, means producing output signals characterizing instantaneous inertial tendencies of said liquid to maintain said spin axis in a fixed attitude upon occurrence of relative angular movement of said structure about a sensing axis normal to said spin axis, regulating means responsive to effects of centrifugal forces within said rotating liquid at different radial positions about said spin axis, said centrifugal forces varying with speed of rotation of said liquid in said chamber, and means responsive to said regulating means producing increase and decrease in response of said output signal means upon decrease and increase, respectively, of said speed of rotation.

18. Apparatus responsive to angular movement comprising a structure having a hollow liquid-tight chamber therein, an electrically conductive liquid filling said chamber, electrical motive means consisting of stationary parts rotating said liquid within said chamber about a spin axis, said motive means including means directing magnetic flux through said conductive liquid to develop liquid-accelerating torques, means producing output signals characterizing instantaneous inertial tendencies of said liquid to maintain said spin axis in a fixed attitude upon occurrence of relative angular acceleration of said structure about a sensing axis normal to said spin axis, a differential pressure sensor including movable membrane means separating two liquid-tight compartments therein, a pair of hollow conduits communicating each of said compartments with said chamber at a different radial distance from said spin axis, said conduits and compartments being filled with said liquid, whereby said membrane means is moved responsive to changes in hydrodynamic pressures in said chamber occasioned by centrifugal forces at various rotational speeds, and means responsive to movements of said membrane means producing increase and decrease in response of said output signal means upon decrease and increase, respectively, of said speed of rotation.

References Cited in the file of this patent
UNITED STATES PATENTS

| | | |
|---|---|---|
| 2,753,469 | Stathan et al. | July 3, 1956 |
| 2,856,142 | Haviland | Oct. 14, 1958 |
| 2,857,122 | Maguire | Oct. 21, 1958 |

Disclaimer 2,949,784.—*Paul F. Maeder*, East Providence, R.I. GYROSCOPE DEVICE. Patent dated Aug. 23, 1960. Disclaimer filed Apr. 4, 1962, by the assignee, *Speidel Corporation*.

Hereby enters this disclaimer to claims 1, 2, 3, 4, 7 and 8 of said patent.
[*Official Gazette May 29, 1962.*]